United States Patent
Minkkinen et al.

(10) Patent No.: US 12,115,508 B2
(45) Date of Patent: Oct. 15, 2024

(54) SINGLE-SCREW EXTRUDER AND A METHOD FOR EXTRUSION

(71) Applicant: TEKNOLOGIAN TUTKIMUSKESKUS VTT OY, Espoo (FI)

(72) Inventors: Hannu Minkkinen, Tampere (FI); Juha Mannila, Tampere (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 680 days.

(21) Appl. No.: 17/422,066

(22) PCT Filed: Jan. 10, 2020

(86) PCT No.: PCT/FI2020/050017
§ 371 (c)(1),
(2) Date: Jul. 9, 2021

(87) PCT Pub. No.: WO2020/144407
PCT Pub. Date: Jul. 16, 2020

(65) Prior Publication Data
US 2022/0097014 A1    Mar. 31, 2022

(30) Foreign Application Priority Data
Jan. 11, 2019   (FI) ...................................... 20195016

(51) Int. Cl.
*B01F 27/272* (2022.01)
*B01F 23/43* (2022.01)
(Continued)

(52) U.S. Cl.
CPC .......... *B01F 27/2722* (2022.01); *B01F 23/43* (2022.01); *B01F 23/47* (2022.01);
(Continued)

(58) Field of Classification Search
CPC ..... B29C 48/32; B29C 48/397; B29C 48/625; B01F 27/2722
See application file for complete search history.

(56) References Cited

U.S. PATENT DOCUMENTS

| | | | | |
|---|---|---|---|---|
| 2,783,498 A | * | 3/1957 | Richardson | B29B 7/429 198/677 |
| 5,204,039 A | | 4/1993 | Miyasaka et al. | |

(Continued)

FOREIGN PATENT DOCUMENTS

| | | |
|---|---|---|
| EP | 0299241 A2 | 1/1989 |
| EP | 0489534 A1 | 6/1992 |

(Continued)

OTHER PUBLICATIONS

International Search Report (PCT/ISA/210) with translation and Written Opinion (PCT/ISA/237) mailed on May 6, 2020, by the European Patent Office as the International Searching Authority for International Application No. PCT/FI2020/050017.

(Continued)

*Primary Examiner* — Elizabeth Insler
(74) *Attorney, Agent, or Firm* — BUCHANAN, INGERSOLL & ROONEY PC

(57) ABSTRACT

A single-screw extruder and method are disclosed wherein the extruder includes a cylindrical rotor member arranged in a barre, and a drive system for rotation of the rotor member in the barrel. The extruder includes an outlet-provided with a die, having an outer ring arranged to the barrel, and an inner die part, the die establishing a flow channel that is continuously circular in all its cross-sections.

19 Claims, 3 Drawing Sheets

(51) Int. Cl.
  *B01F 23/47* (2022.01)
  *B01F 35/92* (2022.01)
  *B01F 35/90* (2022.01)
  *B01F 101/00* (2022.01)

(52) U.S. Cl.
  CPC .......... *B01F 35/92* (2022.01); *B01F 2035/98* (2022.01); *B01F 2035/99* (2022.01); *B01F 2101/2805* (2022.01); *B01F 2215/0431* (2013.01)

(56) References Cited

U.S. PATENT DOCUMENTS

| | | | | |
|---|---|---|---|---|
| 6,080,346 | A | * | 6/2000 | Jack ................... B29C 48/0017 425/382.2 |
| 6,524,516 | B1 | | 2/2003 | Rydberg et al. |
| 2013/0285276 | A1 | * | 10/2013 | Ahlgrimm ............ B29C 48/405 264/141 |
| 2016/0279841 | A1 | * | 9/2016 | Fitzpatrick .............. B29C 45/23 |
| 2019/0184621 | A1 | | 6/2019 | Minkkinen et al. |

FOREIGN PATENT DOCUMENTS

| | | |
|---|---|---|
| EP | 0999030 A2 | 5/2000 |
| GB | 1493559 A | 11/1977 |
| JP | S5676420 U | 6/1981 |
| JP | S57128521 A | 8/1982 |
| JP | H054268 A | 1/1993 |
| JP | H07504854 A | 6/1995 |
| JP | H09150447 A | 6/1997 |
| JP | H09183156 A | 7/1997 |
| JP | H11179783 A | 7/1999 |
| JP | 4622595 B2 | 2/2011 |
| WO | 0018572 A1 | 4/2000 |
| WO | 2015123757 A1 | 8/2015 |
| WO | 2018037164 A1 | 3/2018 |

OTHER PUBLICATIONS

Notice of Reasons for Refusal dated Oct. 31, 2023, issued in the corresponding Japanese Patent Application No. 2021-540062, 6 pages of English Translation only.

Office Action issued in Indian Patent Application No. 202117035965, dated Dec. 26, 2022, with English Translation (6 pages).

* cited by examiner

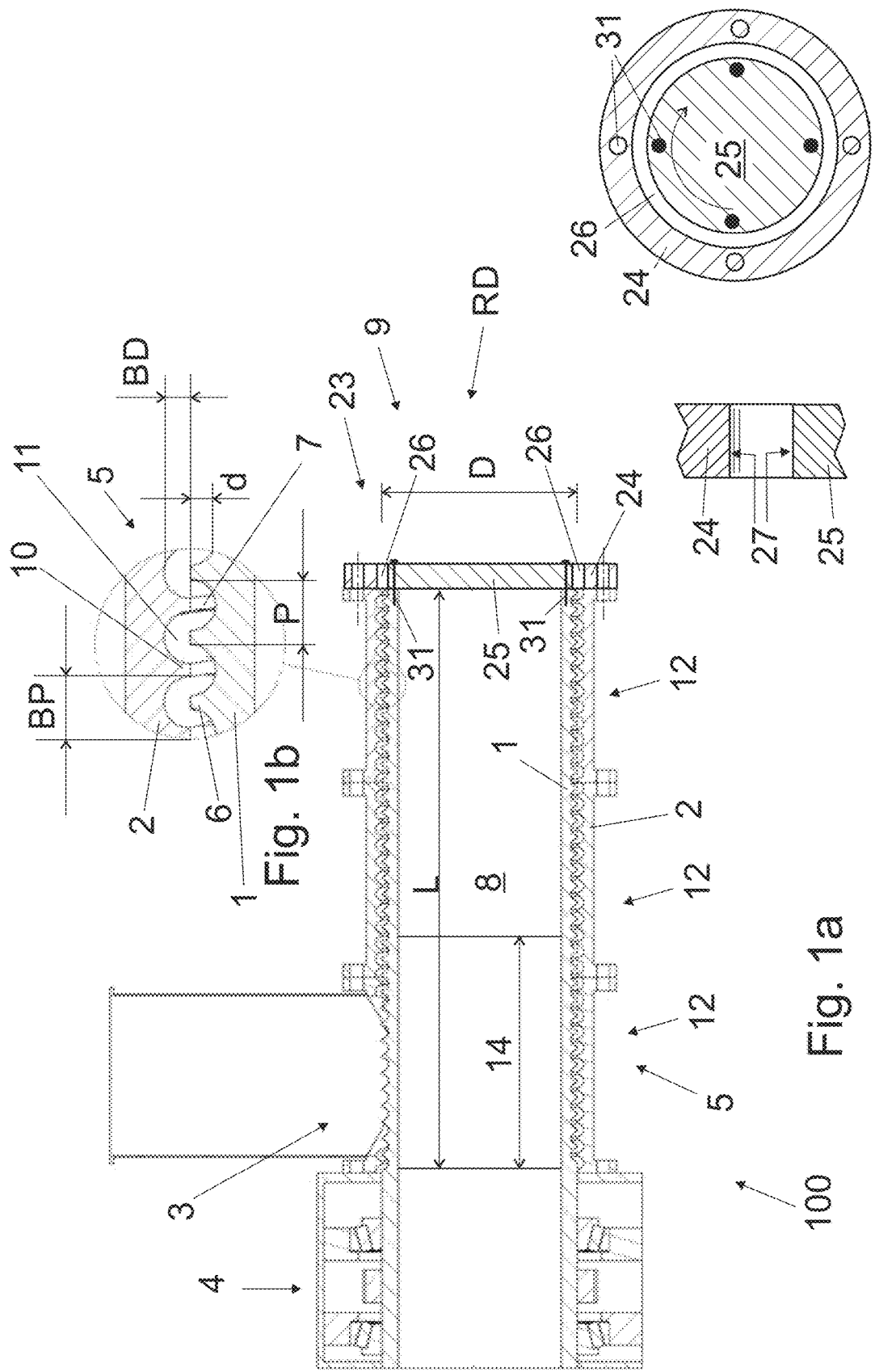

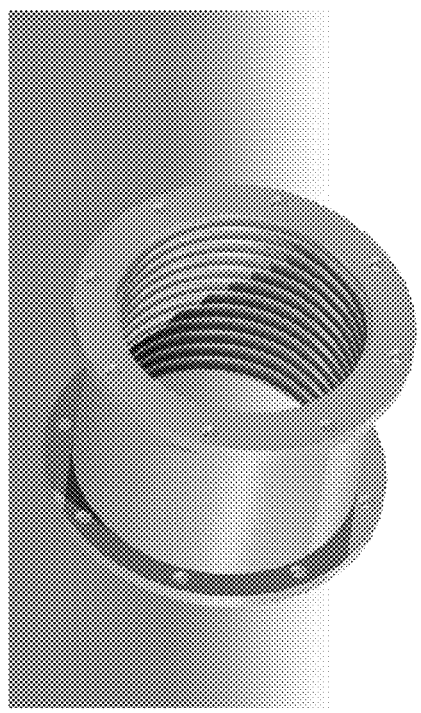
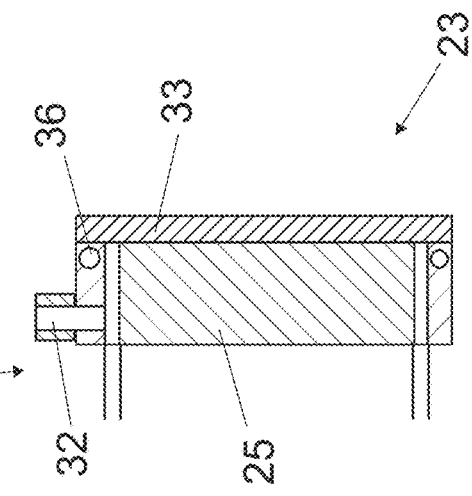
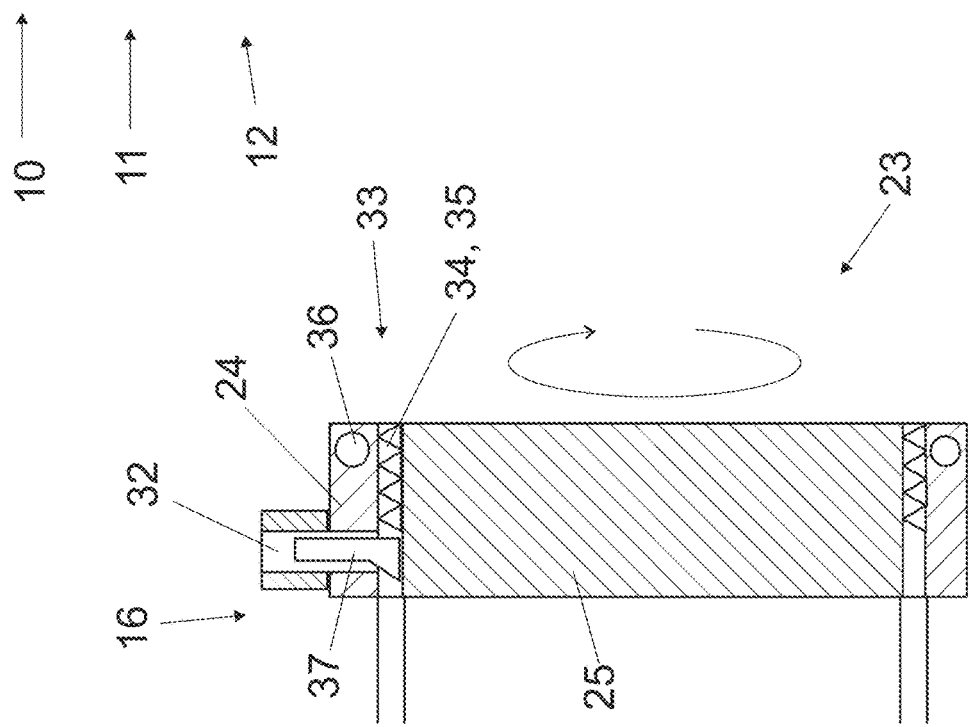

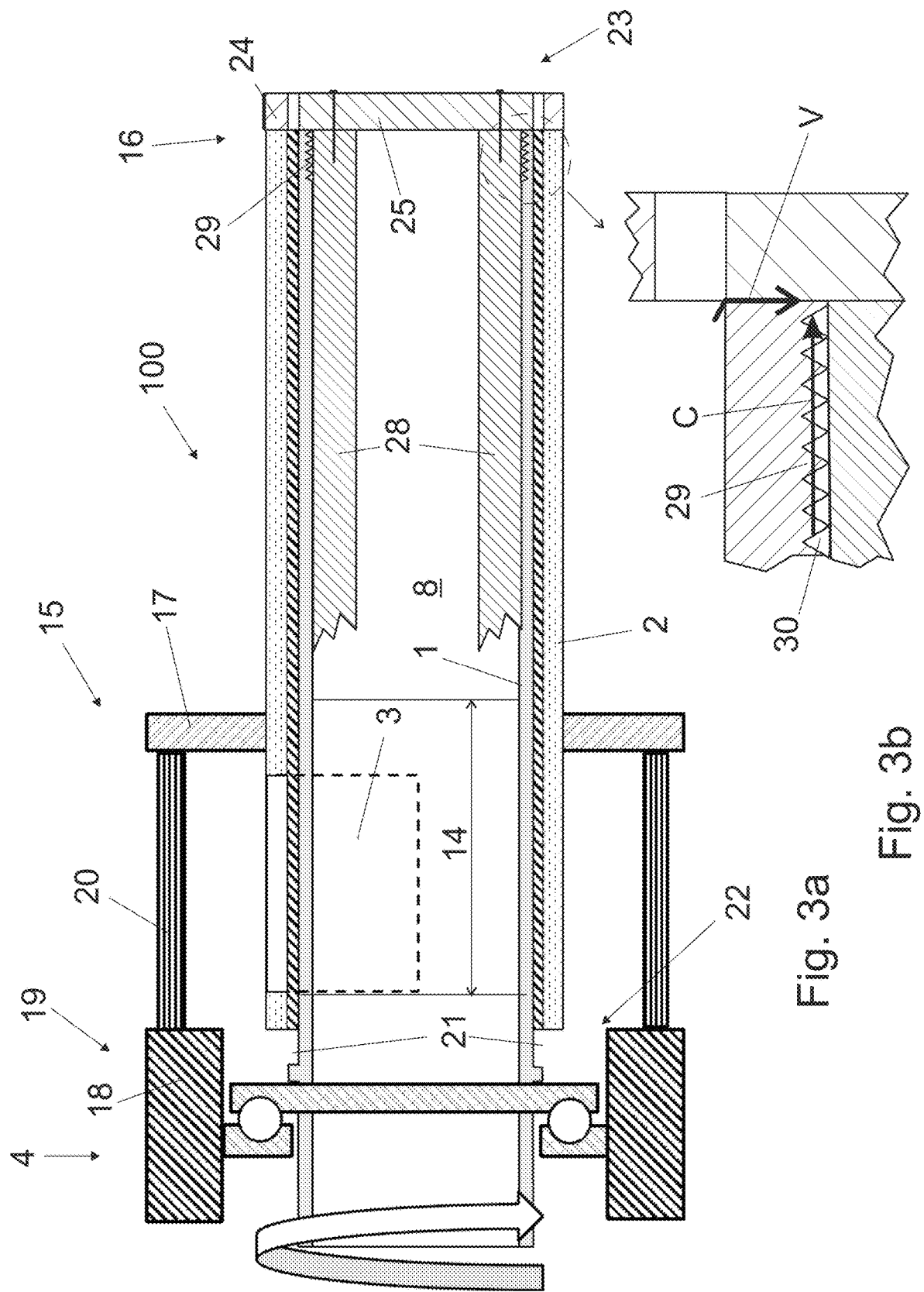

SINGLE-SCREW EXTRUDER AND A METHOD FOR EXTRUSION

BACKGROUND

The invention relates to a single-screw extruder, comprising a cylindrical rotor member having diameter and length and comprising a feeding zone, the rotor member arranged in a barrel.

The invention further relates to a method for extrusion.

The demand for processing recycled materials is continuously growing. This type of materials are in their density, physical state, particle size and shape etc. extremely heterogeneous materials. A problem arising with these materials is that heterogeneous materials are extremely difficult to be processed in commonly known extruders and compounding devices.

BRIEF DESCRIPTION

Viewed from a first aspect, there can be provided a single-screw extruder, comprising
- a cylindrical rotor member having diameter and length and comprising a feeding zone,
- the rotor member arranged in a barrel,
- the cylindrical surface of the rotor member carrying cavity/cavities and/or projection(s) arranged in helically extending rows,
- the helically extending row(s) of the rotor member having a pitch and depth in the feeding zone of the rotor member, and the extruder further comprising
- a drive system for the rotation of the rotor member (1) in the barrel, wherein
- the relation of the depth to the diameter of the rotor member, i.e. d:D, is not more than 1:20, and
- the relation of the pitch of the rotor member to the diameter (of the rotor member, i.e. P:D, is not more than 1:4, wherein an outlet of the extruder is provided with a die, comprising
- an outer ring arranged to the barrel,
- an inner die part arranged to the cylindrical rotor member and rotate therewith,
- the die establishing a flow channel that is continuously circular in all its cross-sections.

Thereby an extruder for processing heterogeneous materials may be achieved.

Viewed from a second aspect, there can be provided a single-screw extruder, comprising
- a cylindrical rotor member having diameter and length and comprising a feeding zone,
- the rotor member arranged in a barrel,
- the cylindrical surface of the rotor member carrying cavity/cavities and/or projection(s) arranged in helically extending rows,
- the helically extending row(s) of the rotor member having a pitch and depth in the feeding zone of the rotor member, and the extruder further comprising
- a drive system for the rotation of the rotor member in the barrel, wherein
- the relation of the depth to the diameter of the rotor member, i.e. d:D, is not more than 1:20, and
- the relation of the pitch of the rotor member to the diameter of the rotor member, i.e. P:D, is not more than 1:4, wherein
- the rotor member comprises a cylindrical channel, the diameter of which is at least 75%, preferably 80 to 85%, of the diameter of the rotor member, that an outlet of the extruder is provided with a die, the die comprising an outer ring and an inner die part creating a flow channel that is continuously circular in all its cross-sections, that
- the outer ring is attached to the barrel, and that
- the inner die part is supported to a support structure that is arranged inside said cylindrical channel,
- the rotor member being arranged rotatable in respect to the inner die part.

Thereby an extruder for converting heterogeneous material flows into raw material for further processing may be achieved.

Viewed from a third aspect, there can be provided a method for extrusion, the method comprising steps of:

A) feeding the material in a single-screw extruder, the extruder comprising
- a cylindrical rotor member having diameter and length and comprising a feeding zone,
- the rotor member arranged in a barrel,
- the cylindrical surface of the rotor member carrying cavity/cavities and/or projection(s) arranged in helically extending rows,
- the helically extending row(s) of the rotor member having a pitch and depth in the feeding zone of the rotor member, and the extruder further comprising
- a drive system for the rotation of the rotor member in the barrel, wherein
- the relation of the depth to the diameter of the rotor member, i.e. d:D, is not more than 1:20, and
- the relation of the pitch of the rotor member to the diameter of the rotor member, i.e. P:D, is not more than 1:4, B) heating the material in said single-screw extruder to a flowable state, and C) feeding the material in outlet of the extruder, the outlet being provided with a die, comprising
- an outer ring arranged to the barrel,
- an inner die part arranged to the cylindrical rotor member and rotate therewith,
- the die establishing a flow channel that is continuously circular in all its cross-sections, and D) allowing the material to exit between the outer ring and the rotating inner die part.

Thereby a method for converting heterogeneous material flows into raw material for further processing may be achieved.

Viewed from a fourth aspect, there can be provided a method for extrusion, the method comprising steps of:

A) feeding the material in a single-screw extruder, the extruder comprising
- a cylindrical rotor member having diameter and length and comprising a feeding zone,
- the rotor member arranged in a barrel,
- the cylindrical surface of the rotor member carrying cavity/cavities and/or projection(s) arranged in helically extending rows,
- the helically extending row(s) of the rotor member having a pitch and depth in the feeding zone of the rotor member, and the extruder further comprising
- a drive system for the rotation of the rotor member in the barrel, wherein
- the relation of the depth to the diameter of the rotor member, i.e. d:D, is not more than 1:20, and
- the relation of the pitch of the rotor member to the diameter of the rotor member, i.e. P:D, is not more than 1:4, B) heating the material in said single-screw extruder to a flowable state, and C) feeding the material in outlet of the extruder, the outlet being provided with a die, comprising an outer ring and an inner die part creating a flow channel that is continuously circular in all its cross-sections, wherein the outer ring is arranged to the barrel, and the inner die part is supported to a support structure that is arranged inside said cylindrical channel, the rotor member being arranged rotable in respect to the inner die part, and D) allowing the material to exit between the outer ring and the unrotating inner die part.

Thereby a method for converting heterogeneous material flows into raw material for further processing may be achieved.

The arrangements and the methods are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

BRIEF DESCRIPTION OF FIGURES

Some embodiments illustrating the present disclosure are described in more detail in the attached drawings, in which FIG. 1a is a schematic side view of an extruder in partial cross-section, FIG. 1b is a schematic view of a detail of the extruder shown in FIG. 1a in partial cross-section, FIG. 1c is a schematic view of a detail of the extruder shown in FIG. 1a in partial cross-section, FIG. 1d is a schematic view of a detail of the extruder shown in FIG. 1a in partial cross-section, FIG. 2 is a schematic view of a piece of an extruder barrel, FIG. 3a is side view of another extruder in partial cross-section, FIG. 3b is a schematic view of a detail of the extruder shown in FIG. 3a in partial cross-section, FIG. 4 is side view of an extruder die in partial cross-section, and FIG. 5 is side view of another extruder die in partial cross-section.

In the figures, some embodiments are shown simplified for the sake of clarity. Similar parts are marked with the same reference numbers in the figures.

DETAILED DESCRIPTION

FIG. 1a is a schematic side view of a screw extruder in partial cross-section, FIG. 1b is a schematic view of a detail of the extruder shown in FIG. 1a in partial cross-section, FIG. 1c is a schematic view of a detail of the extruder shown in FIG. 1a in partial cross-section, and FIG. 1d is a schematic view of a detail of the extruder shown in FIG. 1a in partial cross-section.

The term "screw extruder" or "extruder" means here not only extruders for plastic extrusion but also compounding extruders, and extruders for other materials that may be in flowable form at least partly or that may be rendered, at least partly, in flowable form, such as recycled materials originating e.g. from industrial activities or households.

According to an aspect, the extruder 100 may be used for converting waste or recycled materials into raw material for use in subsequent processes. One aspect of the invention is that raw material can be used or stored essentially easier and/or in more compact physical state and/or more cleanly, etc. than the material fed in the extruder. The subsequent process may be another extrusion process, molding process etc.

According to another aspect, the extruder 100 may be used for compounding process, e.g. in manufacturing polymer-fibre compositions.

The extruder 100 is a single-screw extruder comprising a cylindrical rotor member 1, a barrel 2, a feed opening 3, and a drive system 4 for the rotation of the rotor member 1 in the barrel 2.

The rotor member 1 has diameter D and length L. In an embodiment, the relation of the length to the diameter, i.e. L:D, is in range of 2:1 to 4:1.

The cylindrical outer surface of the rotor member 1 comprises projections 5 that realizes a screw thread comprising at least one screw flight 6 and at least one screw channel 7 between the at least one screw flight 6.

The screw thread constitutes a structure that transfers the material to be processed in the barrel from the feed opening 3 towards the outlet 9 while the rotor member 1 is rotating in the barrel 2. In an embodiment, the profile of the screw thread is invariable. In another embodiment, the profile of the screw thread is variable such that the volume of the screw channel decreases towards the outlet 16 of the extruder. In an embodiment, the depth d of the cavity/cavities and/or projection(s) 5 arranged on the surface of rotor is arranged to decrease after feed zone (10).

The decreasing of the screw channel volume causes a compression ratio which is typically 1:2 to 1:4. The profile may change step by step, or it may comprise at least one section where the profile changes rapidly from one profile to another profile.

The screw flight 6 has pitch P and the screw channel 7 has depth d in the feeding zone 14 of the rotor member 1. The "feeding zone" means that part of the rotor member 1 that is directly under the feed opening 3 and one to five lap(s) of the flight 6 following the feed opening.

According to an aspect, the relation of the depth d to the diameter D, i.e. d:D, is not more than 1:20, and the relation of the pitch P to the diameter D, i.e. P:D, is not more than 1:4. An advantage is that the volume of the screw channel 7 is very low compared to the screw diameter D. Thus it is possible to provide the extruder 100 with a very large feed opening 3 compared to the volume of the screw channel 7. Following this, light density and/or heterogeneous materials, such as materials comprising fibres, waste/recycled plastic, can be fed in the extruder 100 in amounts sufficient to fill optimally the screw channel 7. Another advantage is that the low volume compared to the screw diameter D decreases power requirement of the extruder.

In an embodiment, d:D is in range of 1:300 to 1:20 (in the feeding zone 14 of the rotor member 1). An advantage is that the temperature of the material to be processed in the screw channel 7 may be controlled very precisely due to large surface area of the screw channel compared to volume of the material, and thus e.g. materials or processes highly sensitive to temperature may be processed by the extruder.

In an embodiment, P:D is in range of 1:60 to 1:4. An advantage is that the material to be processed may be transferred towards the outlet 7 by low power usage.

In an embodiment, the rotor member 1 realizes equation $$CL \cdot d \leq RD \cdot 0.01, \text{ wherein}$$

CL=CL=channel length measured in direction of length (L) of the rotor member 1, d=channel depth measured in radial direction of the rotor member 1, and RD=cross-sectional area of the rotor member, including also the cross-sectional area of the channel 8.

An advantage is that the volume of the screw channel 7 is very low compared to the screw diameter D, and thus easily filled with the material to be processed due to a large feed opening 3. For instance, the diameter of the rotor member 1 may be 350 mm whereas the length following the feed opening is 400 mm.

In an embodiment, the feed opening 3 or the feeding zone comprises shearing or cutting means for reducing the particle size of the material being fed in the extruder 100. This means may comprise e.g. cutting teeth arranged on the rotor member 1 and counterpart(s) arranged in the barrel 2.

According to an aspect, the rotor member 1 is hollow. In an embodiment, the rotor member comprises a cylindrical channel 8, such as circular cylinder, the diameter of which is at least 75%, preferably 80 to 85%, of the diameter D of the rotor member. This means that the diameter D of the rotor member may be increased compared to the known rotor members without increasing the weight and expenses thereof.

In an embodiment, the rotor member comprises one screw flight. In another embodiment, the rotor member comprises two, or even more, screw flights.

Thanks to the large diameter of the rotor member 1, the drive system 4 may be construed to transmit high torques in the rotor member 1. Also the structure of the rotor member 1 may stand high torques without risk for damages. The extruder 100 may be realized many alternative ways. For instance, in an embodiment the rotor member 1 comprises helically extending rows of plurality of separate cavities, instead of the screw thread. Said cavities constitute a structure that transfers the material to be processed in the barrel from the feed opening 3 towards the outlet 9.

The shape of the cavities may be e.g. dome, hemispheric, a section or calotte of tear-drop, oval or combinations thereof.

According to an aspect, the relation of the depth d to the diameter D in the feeding zone 14 of the rotor member 1, i.e. d:D, is not more than 1:20, and the relation of the pitch P to the diameter D, i.e. P:D, is not more than 1:4. An advantage is that the volume of the cavities is very low compared to the screw diameter D, and thus light density and/or heterogeneous materials, such as materials comprising fibres, waste/recycled plastic, can be fed in the extruder 100 in amounts sufficient to fill optimally the volume between the rotor member 1 and the barrel 2.

In an embodiment, d:D is in range of 1:300 to 1:20.

In an embodiment, P:D is in range of 1:60 to 1:4.

In another embodiment, the rotor member 1 comprises projections that realize helically extending rows of plurality of discrete projections, the row comprising pitch P.

According to an aspect, the relation of the depth d, or height of the projections, to the diameter D, i.e. d:D, is not more than 1:20, and the relation of the pitch P to the diameter D, i.e. P:D, is not more than 1:4.

In an embodiment, d:D is in range of 1:300 to 1:20.

In an embodiment, P:D is in range of 1:60 to 1:4.

According to an aspect, the cylindrical inner surface of the barrel 2 may comprise barrel cavity/cavities and/or projection(s). In an embodiment, said barrel cavity/cavities and/or projection(s) are arranged in helically extending rows. In another embodiment, the barrel cavity/cavities and/or projection(s) are arranged parallel with longitudinal axis of the rotor member 1. In still another embodiment, the barrel cavity/cavities and/or projection(s) are arranged perpendicular with the longitudinal axis of the rotor member 1.

In an embodiment, the barrel 2 comprises a barrel screw thread comprising at least one barrel flight 10 and at least one barrel channel 11 between the at least one flight, the barrel flight having a barrel pitch BP and the barrel channel having a barrel depth BD.

An advantage is that transfer of the material to be processed towards the outlet 9 may be enhanced.

In another embodiment, the cavities arranged in the barrel 2 realize helically extending rows of plurality of separate cavities.

An advantage is that the mixing and blending properties of the extruder may be enhanced.

The cavities arranged in the barrel 2 may be invariable in their shape and size in all the length of the barrel they exist. In another embodiment, the barrel 2 may comprise variable sized and/or shaped cavities.

In an embodiment, the barrel cavity/cavities and/or projection(s) 5 are not continuous, such that there are several cavities or grooves side by side.

The outlet 16 of the extruder is provided with a die 23. The die 23 comprises an outer ring 24 that is attached to the barrel 2, and an inner die part 25 attached to the cylindrical rotor member 1. The inner die part 25 thus rotates with the rotor member 1.

The die 23 establishes a flow channel 26 that is continuously circular in all its cross-sections, as can be seen best in FIG. 1c.

In an embodiment, the outer ring 24 is removably attached to the extruder 100 by e.g. bolts. In another embodiment, the outer ring 24 is attached permanently to the barrel e.g. by welding.

In an embodiment, the inner die part 25 is removably attached to the extruder 100, more precisely to the rotor member 1. In another embodiment, the inner die part 25 is attached permanently to the rotor member 1.

In an embodiment, both the outer ring 24 and the inner die part 25 are fixedly attached to the extruder 100. In another embodiment, both the outer ring 24 and the inner die part 25 are removably attached to the extruder 100.

The outer ring 24 and the inner die part 25 has a flow surfaces 27 that define the flow channel 26. In an embodiment, the flow surface 27 of the outer ring 24 is essentially smooth. In another embodiment, the flow surface 27 of the outer ring 24 comprises corrugations that differ from surface structure the inner surface of the barrel 2.

In an embodiment, the flow surface 27 of the inner die part 25 is essentially smooth. In another embodiment, the flow surface 27 of the inner die part 25 comprises corrugations that differ from surface structure arranged on the rotor member 1.

In an embodiment, deepness of said corrugations in the flow surface 27 mentioned above are in range of 1:300 to 1:20, preferably 1:160 to 1:300, compared to the diameter of the corresponding flow surface 27.

In an embodiment, the cross-sectional area of the flow channel 26 of the die is constant all the length of the die 23. An advantage is that the geometry is easy to manufacture. The pressure before the die is easy to control by the die section length. Additionally, when the channel is constant, it is easy to connect one or more die sections sequentially.

In another embodiment, said cross-sectional area is reducing towards the exit of the die 23. An advantage is that the die can be used to increase the pressure of outcoming material flow and thus improve the mixing process.

In still another embodiment, said cross-sectional area is expanding towards the exit of the die 23. An advantage is that the die is self-cleaning, any material which access the die can come out. In the case of cooled die even poorly flowing material can exit the die.

FIG. 2 is a schematic view of a piece of an extruder barrel. According to an aspect, the barrel 2 is construed from two or more barrel modules 12 that are separately manufactured and then connected consecutively.

An advantage is that the barrel cavity/cavities and/or projection(s), such as barrel screw thread comprising at least one barrel flight 10 and at least one barrel channel 11, may be manufactured in short pieces of the barrel more easily into short and large in diameter barrel module 12 than they would be manufactured in one monolithic barrel having equal length. It is to be noted, however, that the barrel 2 may also be manufactured in one piece. In the latter case, the barrel cavity/cavities and/or projection(s) can still be manufactured extremely easily due to high D:L relationship of the extruder.

FIG. 3a is side view of another extruder in partial cross-section, and FIG. 3b is a schematic view of a detail of the extruder shown in FIG. 3a in partial cross-section.

The feed opening 3 is substantially big comparing to the capacity of the extruder and the depth of the rotor cavities. In an embodiment, the projected area of the feed opening is about 50 square centimeters per kilowatt.

In an embodiment, the feed opening 3 is cut to the halfway of the diameter of the barrel 2, i.e. approximately D/2. Thus the feed opening 3 potentially weakens the structure of the barrel 2 such an extent, that the barrel 2 is not able to carry the load caused during an extrusion process. Especially when the diameter of the barrel is large and the barrel is short, the axial forces tend to bend the barrel at the feeding zone 14.

In an embodiment, the barrel 2 is supported by a support structure 15 that lies outside of the barrel 2. The support structure 15 comprises a first support part 17 that is attached to a section of the barrel 2 between the feed opening 3 and the discharge end 16 of the barrel, a second support part 18 attached to the drive system side 19 of the extruder, and a load transmit structure 20 connecting the first support part 17 to the second support part 18. In the embodiment shown in FIG. 4, the second support part 18 has been fixed to a bearing housing 22 that covers the drive system 4. The load transmit structure 20 may be composed of one or more beam(s), plate structure or trussed construction, for instance.

The support structure 15 bears a part of the loads and stresses caused in an extrusion process and prevents the structure of the extruder from bending.

In an embodiment, there is an axial slot 21 arranged between the feeding zone 14 of the barrel and the bearing housing 22 of the extruder for receiving material (if any) flowing from the feeding zone backwards. Thus the axial slot 21 is to prevent the material to enter in the bearing housing 22. Instead, the material will drop through the slot in a room where it does not cause any problems to the extruder or the extrusion process.

In an embodiment, the barrel 2 is totally separated from the bearing housing 22, i.e. the axial slot 21 extends 360° around longitudinal axle of the extruder. In another embodiment, there are plurality of axial slots 21 that are separated by short sections of material.

In the embodiment shown in FIGS. 3a and 3b, the outlet 16 is provided with a die 23, the outer ring 24 of which is attached to the barrel 2, and the inner die part 25 is supported to a support structure 28 that is arranged inside of the cylindrical channel 8. Thus the rotor member 1 rotates in respect to the inner die part 25, or in another words, the inner part does not rotate.

In the embodiment shown in FIGS. 3a and 3b, the inner surface of a section of the cylindrical channel 8 lying in proximity of the die 23 comprises a counter thread 29, best shown in FIG. 3b. The pitch of the counter thread 29 is arranged in the same direction as the pitch of the cavity/cavities and/or projection(s) 5 arranged in the helically extending rows. The counter thread 29 establishes a counter screw channel 30 with an outer surface of the support structure 28. The counter thread 29 and the counter screw channel 30 create a counteracting means that prevents or essentially inhibits the processed material to penetrate in the channel 8.

In another embodiment, counter thread 29 is arranged on outer surface of the support structure 28. In this embodiment, the pitch of the counter thread 29 is arranged in opposite direction as the pitch of the cavity/cavities and/or projection(s) 5 arranged in the helically extending rows.

In still another embodiment, the extruder comprises both counter threads 29 mentioned above, i.e. in on outer surface of the support structure 28 and the inner surface of the cylindrical channel 8.

FIG. 4 is side view of an extruder die in partial cross-section.

In the embodiments discussed above, the exit of the die 23 is coaxial with the longitudinal axis of the rotor member 1. In another embodiments, the outer ring 24 is provided with at least one radial opening 32 as a material output port. There is also a blocking means 33 arranged to block the end of the flow channel 26 after the radial opening 32 such that the processed material may exit only through the at least one radial opening 32.

In the embodiment shown in FIG. 4, the inner die part 25 rotates with the rotor member 1. The blocking means 33 comprises a reverse thread 34 arranged in the inner die part, the pitch of which is arranged in opposite direction as the pitch of the cavity/cavities and/or projection(s) 5 arranged in the helically extending rows. The reverse thread 34 establishes a reverse screw channel 35 with an inner surface or flow surface 27 of the outer ring 24.

In another embodiment, the reverse thread 34 is arranged in the outer ring 24. In this embodiment, the pitch is in same direction with the pitch of the cavity/cavities and/or projection(s) 5.

In a third embodiment, both the inner die part 25 and the outer ring 24 comprises the reverse thread 34 mentioned above.

The reverse thread(s) 34 direct(s) material to flow towards the radial opening 32.

Additionally, the blocking means 33 may comprise a cooling arrangement 36 arranged to cool the outer ring 24. Cooling of the die 23 rises the viscosity of the processed material, and thus reduces its ability to intrude into gaps and joints in the die. The cooling arrangement 36 may comprise e.g. channels in which cooling liquid may flow.

Embodiments comprising at least one radial opening 32 may have a scraper arrangement 37 that is arranged to remove raw material on a rotating inner die part 25 (as shown) or on a rotating rotor member 1. This may help exit of the material out of the extruder.

FIG. 5 is side view of another extruder die in partial cross-section. In the embodiment shown in FIG. 5, the inner die part 25 does not rotate with the rotor member 1. The outer ring 24 is provided with at least one radial opening 32 as a material output port, and a blocking means 33 for blocking the end of the flow channel 26 after the radial opening 32 being arranged in the die 23.

The blocking means 33 comprises here a simple plate or similar element that closes the flow channel 26. The plate may be fixed removable or permanently to the outer ring 24 and the inner die part 25.

Also this embodiment of the blocking means 33 may comprise a cooling arrangement 36.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 1 rotor member
2 barrel
3 feed opening
4 drive system
5 projection or cavity
6 screw flight
7 screw channel
8 channel
9 outlet
10 barrel flight
11 barrel channel
12 barrel module
13 hollow bar
14 feeding zone
15 barrel support structure
16 extruder outlet end
17 first support part
18 second support part
19 drive system side
20 load transmit structure
21 axial slot
22 bearing housing
23 die
24 outer ring
25 inner die part
26 flow channel
27 flow surface
28 support structure
29 counter thread
30 counter screw channel
31 attaching means
32 radial opening
33 blocking means
34 reverse thread
35 reverse screw channel
6 cooling arrangement
37 scraper arrangement
100 extruder
BD barrel depth
BP barrel pitch
C counter flow
CL channel length
D diameter of the rotor member
d depth
L length of the rotor member
P pitch
RD cross-sectional area of the rotor member
V leakage

The invention claimed is:

1. A single-screw extruder, comprising:
   a cylindrical rotor member having a diameter (D) and a length (L) and including a feeding zone;
   the rotor member being arranged in a barrel;
   a cylindrical surface of the rotor member carrying cavity/cavities and/or projection(s) arranged in helically extending rows;
   the helically extending row(s) of the rotor member having a pitch (P) and depth (d) in the feeding zone of the rotor member;
   a drive system for rotation of the rotor member in the barrel, wherein:
   a relation of a depth (d) to diameter (D) of the rotor member d:D is not more than 1:20; and
   a relation of the pitch (P) of the helically extending rows of the rotor member to the diameter (D) of the rotor member P:D is not more than 1:4; and
   an outlet of the extruder, is provided with a die including:
   an outer ring arranged relative to the barrel; and
   an inner die part arranged relative to the cylindrical rotor member to rotate therewith; and
   the die being configured for establishing a flow channel that is continuously circular in all its cross-sections.

2. The extruder as claimed in claim 1, wherein at least one of the outer ring and the inner die part is removably attached to the extruder.

3. The extruder as claimed in claim 1, wherein at least one of the outer ring and the inner die part is fixedly attached to the extruder.

4. The extruder as claimed in claim 1, wherein a flow surface of the outer ring is essentially smooth.

5. The extruder as claimed in claim 4, wherein the flow surface of the outer ring comprises:
   corrugations that differ from an inner surface of the barrel.

6. The extruder as claimed in claim 4, wherein the flow surface of the inner die part comprises:
   corrugations having a shape and/or dimensions differing from those of the cavity/cavities and/or projection(s) arranged on the rotor member.

7. The extruder as claimed in claim 1, wherein a flow surface of the inner die part is essentially smooth.

8. The extruder as claimed in claim 1, wherein a cross-sectional area of the flow channel of the die is constant over a length of the die.

9. The extruder as claimed in claim 1, wherein the outer ring comprises:
   at least one radial opening as a material output port; and
   a blocking means for blocking an end of the flow channel after the at least one radial opening being arranged in the die.

10. The extruder as claimed in claim 9, wherein the blocking means comprises:
a reverse thread, a pitch of which is arranged in an opposite direction as the pitch of the cavity/cavities and/or projection(s) arranged in the helically extending rows, and wherein:
the reverse thread establishes a reverse screw channel with an outer surface of the outer ring.

11. The extruder as claimed in claim 9, wherein the blocking means comprises:
a cooling arrangement arranged to cool the outer ring.

12. A single-screw extruder, comprising:
a cylindrical rotor member having a diameter (D) and a length (L) and including a feeding zone;
the rotor member being arranged in a barrel;
a cylindrical surface of the rotor member carrying cavity/cavities and/or projection(s) arranged in helically extending rows;
the helically extending row(s) of the rotor member having a pitch (P) and depth (d) in the feeding zone of the rotor member;
a drive system for rotation of the rotor member in the barrel, wherein:
a relation of a depth (d) to a diameter (D) of the rotor member d:D is not more than 1:20; and
a relation of the pitch (P) of the helically extending rows of the rotor member to the diameter (D) of the rotor member P:D is not more than 1:4;
the rotor member includes a cylindrical channel, a diameter of which is at least 75% of the diameter (D) of the rotor member; and
an outlet of the extruder, provided with a die, the die including:
an outer ring and an inner die part creating a flow channel that is continuously circular in all its cross-sections;
the outer ring being attached to the barrel; and
the inner die part being supported to a support structure that is arranged inside said cylindrical channel;
the rotor member being arranged rotable with respect to the inner die part.

13. The extruder as claimed in claim 12, wherein an inner surface of a section of the cylindrical channel lying in proximity of the die comprises;
a counter thread, a pitch of which is arranged in a same direction as the pitch of the cavity/cavities and/or projection(s) arranged in the helically extending rows; and wherein
the counter thread establishes a counter screw channel with an outer surface of the support structure.

14. The extruder as claimed in claim 12, wherein the outer ring comprises:
at least one radial opening as a material output port; and
a blocking means for blocking an end of the flow channel after the at least one radial opening being arranged in the die.

15. The extruder as claimed in claim 14, wherein the blocking means comprises:
a reverse thread, a pitch of which is arranged in an opposite direction as the pitch of the cavity/cavities and/or projection(s) arranged in the helically extending rows; wherein
the reverse thread establishes a reverse screw channel with an inner surface of the outer ring.

16. The extruder as claimed in claim 14, wherein the blocking means comprises:
a cooling arrangement arranged to cool the outer ring.

17. The extruder as claimed in claim 12, wherein a diameter of the cylindrical channel is 80% of the diameter (D) of the rotor member.

18. A method for extrusion, the method comprising:
A) feeding material in a single-screw extruder, the extruder including:
a cylindrical rotor member having a diameter (D) and a length (L) and including a feeding zone;
the rotor member being arranged in a barrel;
the cylindrical surface of the rotor member carrying cavity/cavities and/or projection(s) arranged in helically extending rows;
the helically extending row(s) of the rotor member having a pitch (P) and depth (d) in the feeding zone of the rotor member;
a drive system for the rotation of the rotor member in the barrel, wherein:
a relation of the depth (d) to the diameter (D) of the rotor member d:D is not more than 1:20; and
a relation of the pitch (P) of the helically extending rows of the rotor member to the diameter (D) of the rotor member P:D is not more than 1:4;
B) heating the material in said single-screw extruder to a flowable state;
C) feeding the material into an outlet of the extruder, the outlet being provided with a die including:
an outer ring arranged relative to the barrel; and
an inner die part arranged relative to the cylindrical rotor member to rotate therewith;
the die establishing a flow channel that is continuously circular in all its cross-sections; and
D) allowing the material to exit between the outer ring and the rotating inner die part.

19. A method for extrusion, the method comprising:
A) feeding material in a single-screw extruder, the extruder including:
a cylindrical rotor member having a diameter (D) and a length (L) and including a feeding zone;
the rotor member being arranged in a barrel;
the cylindrical surface of the rotor member carrying cavity/cavities and/or projection(s) arranged in helically extending rows;
the helically extending row(s) of the rotor member having a pitch (P) and depth (d) in the feeding zone of the rotor member;
a drive system for rotation of the rotor member in the barrel, wherein;
a relation of the depth (d) to the diameter (D) of the rotor member d:D is not more than 1:20; and
a relation of the pitch (P) of the helically extending rows of the rotor member to the diameter (D) of the rotor member P:D is not more than 1:4;
B) heating the material in said single-screw extruder to a flowable state;
C) feeding the material into an outlet of the extruder, the outlet being provided with a die comprising including an outer ring and an inner die part creating a flow channel that is continuously circular in all its cross-sections, wherein:
the outer ring is arranged relative to the barrel and
the inner die part is supported to a support structure that is arranged inside said a cylindrical channel of the rotor member;
the rotor member being arranged rotable in with respect to the inner die part; and D) allowing the material to exit between the outer ring and an unrotating surface of the inner die part.

* * * * *